Oct. 28, 1924.
H. D. LUKER
1,513,515
SIGNAL BOX
Filed Jan. 20, 1922
2 Sheets-Sheet 1
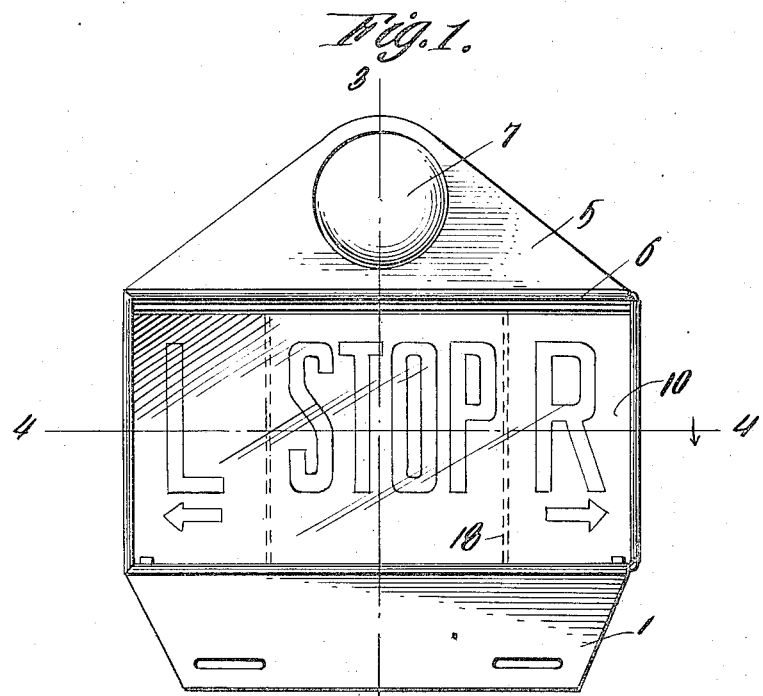
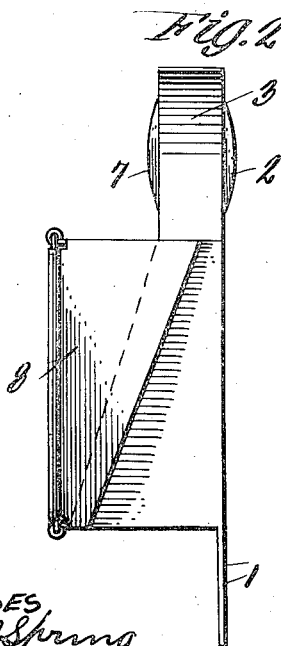
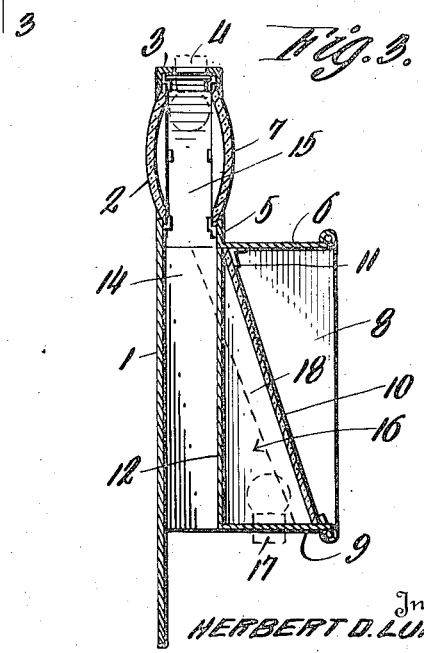
Inventor
HERBERT D. LUKER Oct. 28, 1924.
H. D. LUKER
SIGNAL BOX
Filed Jan. 20, 1922
1,513,515
2 Sheets-Sheet 2
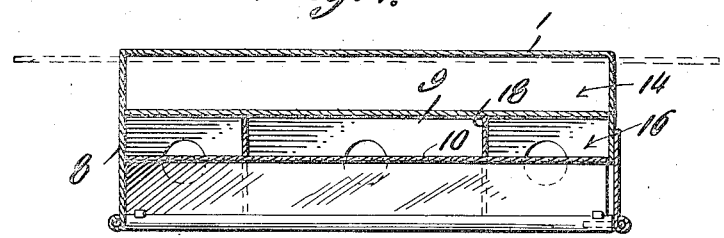
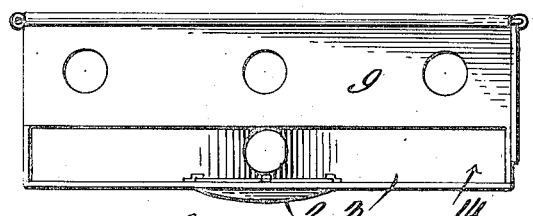
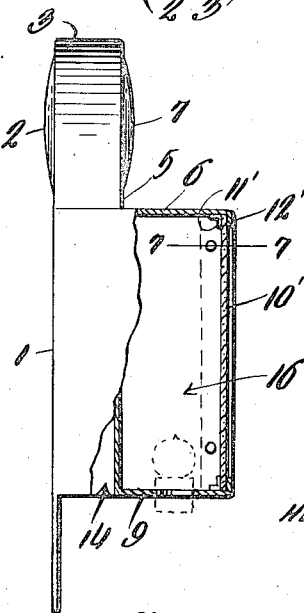
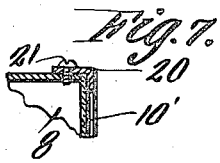
Inventor
HERBERT D. LUKER
By Richard B. Owen, Attorney
WITNESSES Patented Oct. 28, 1924.

1,513,515

UNITED STATES PATENT OFFICE.

HERBERT D. LUKER, OF CHICAGO, ILLINOIS, ASSIGNOR OF ONE-HALF TO WALTER A. HILDEBRECHT, CLEMENS FORTMANN, AND M. JAY MEYERS, ALL OF CHICAGO, ILLINOIS.

SIGNAL BOX.

Application filed January 20, 1922. Serial No. 530,676.

*To all whom it may concern:*

Be it known that I, HERBERT D. LUKER, a citizen of the United States, residing at Chicago, in the county of Cook and State of Illinois, have invented certain new and useful Improvements in Signal Boxes, of which the following is a specification.

The present invention relates to signal boxes especially useful in connection with automobiles and has for its principal object to combine a lighting system with the signal box which will allow an automobile to be parked with comparative safeness along the road, the light being so arranged as to be distinctly seen by an oncoming vehicle.

Another important object of the invention is to construct a signal box which will be attractive in appearance, economical to manufacture, and well adapted to the purpose for which it is designed.

With the above and numerous other objects in view, the invention resides in certain novel features of construction, and the combination and arrangement of parts as will be hereinafter more fully described and claimed.

In the drawing:—

Figure 1 is a front elevation of the preferred embodiment of the invention,

Figure 2 is an end elevation thereof,

Figure 3 is a vertical section taken on the line 3—3 of Figure 1,

Figure 4 is a horizontal section taken on the line 4—4 of Figure 1 looking in the direction of the arrow, Figure 5 is a bottom plan thereof, Figure 6 is an end elevation of a modification, a portion thereof being shown in section, and Figure 7 is a detailed section taken on the line 7—7 of Figure 6.

Referring to the drawing in detail it will be seen that the preferred embodiment of the invention consists of a back plate 1 the top end of which is tapered and provided with an aperture for receiving a transparent concavo-convex panel 2. A cover 3 is attached along one edge to the plate 1 so as to receive a socket indicated at 4. An auxiliary plate 5 is attached to the cover 3 and extends parallel with the upper end of the plate 1 and in spaced relation thereto and is tapered so as to conform in shape with the upper end of the plate 1 and the cover 3. This auxiliary plate 5 is preferably formed integral with the cover 3 and is extended at right angles as shown at 6. A transparent panel 7 similar to the panel 2 is provided in its aperture so as to register with the panel 2. Side pieces 8 depend from the ends of the extension 6 and a bottom piece 9 extends between their bottom ends. A transparent plate 10 is situated between the members 6, 8 and 9 and extends diagonally from the outer edge of the member 9 to the inner edge of the member 6 and is held in place by the cleats 11. A wall member 12 is disposed so as to form a continuation of the auxiliary plate 5 and is attached at its bottom end to the bottom piece 9. By this construction it will be seen that a compartment 14 is formed which is in communication with the compartment 15 so that the light in the compartment 15 may be delivered down toward the ground. This signal box is preferably mounted on the lefthand rear mud guard and therefore the light will be projected downwardly on the road so that the mud guard upon which it is mounted may readily be seen by drivers of oncoming vehicles so that they may easily pass the parked vehicle without guessing at its exact location as is quite frequently the case under present circumstances. This signal box also provides the compartment 16 formed by the bottom piece 9, transparent plate 10 and wall 12. A plurality of illuminating means 17 are mounted in the compartment 16 and the transparent plate 10 is provided with suitable signalling words or letters as shown to advantage in Figure 1. The compartment 16, of course, may be divided into sub-compartments by walls 18 whereby different signals may be provided as is shown to advantage in Figure 1.

In the modification shown in Figure 6 I provide a vertical transparent plate 10' which is held in place by the cleats 11' and the flanges 12' along the top piece 6, bottom piece 9, and one of the side pieces 8. On the other side piece I provide a removable angle piece 20 held in place by screws 21 so that the transparent plate 10' may be slid out of the box when it is so desired.

Having thus described my invention what I claim as new is:—

In a signal box, a casing including side walls, a top wall, a bottom wall, and a rear wall, the side, top and bottom walls terminating in the same plane and extending outwardly from the rear wall, a transparent inclined panel disposed in the casing extending from the forward edge of the bottom wall to the rear edge of the top wall and arranged between the side walls, and a light in said compartment disposed in rear of the panel.

In testimony whereof I affix my signature.

HERBERT D. LUKER.